(12) United States Patent
Pydin

(10) Patent No.: US 12,024,199 B2
(45) Date of Patent: Jul. 2, 2024

(54) AUTONOMOUS TRAVELING SYSTEM

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 17/671,828

(22) Filed: Feb. 15, 2022

(65) Prior Publication Data

US 2022/0281479 A1     Sep. 8, 2022

(30) Foreign Application Priority Data

Mar. 8, 2021 (JP) .................................. 2021-036526

(51) Int. Cl.
*B60W 60/00* (2020.01)
*B60W 30/04* (2006.01)

(52) U.S. Cl.
CPC ......... *B60W 60/0016* (2020.02); *B60W 30/04* (2013.01); *B60W 2530/201* (2020.02)

(58) Field of Classification Search
CPC ............. B60W 60/0016; B60W 30/04; B60W 2530/201
See application file for complete search history.

(56) References Cited

U.S. PATENT DOCUMENTS

| | | | |
|---|---|---|---|
| 2013/0030570 A1* | 1/2013 | Shimizu ................ | B25J 9/1679 901/1 |
| 2014/0100768 A1* | 4/2014 | Kessens .................. | G05D 3/00 701/124 |
| 2018/0162410 A1* | 6/2018 | Skillsäter ............. | B60W 30/04 |
| 2018/0215376 A1* | 8/2018 | Kuhara ................ | G05D 1/0212 |
| 2019/0056739 A1* | 2/2019 | Sunil Kumar ........ | G06V 20/56 |
| 2019/0337154 A1* | 11/2019 | Holson ................. | B25J 9/1697 |
| 2022/0314986 A1* | 10/2022 | Bando ................. | G05D 1/0223 |

FOREIGN PATENT DOCUMENTS

JP     2020-169082     10/2020

* cited by examiner

*Primary Examiner* — Khoi H Tran
*Assistant Examiner* — Tristan J Greiner
(74) *Attorney, Agent, or Firm* — Rankin, Hill & Clark LLP

(57) ABSTRACT

An autonomous traveling system includes: an information storage unit storing beforehand, for each of points on a target route from a departure place to a destination, turnability information indicating whether an autonomous traveling body traveling autonomously along the target route can turn to change a traveling posture thereof; and a travel planning unit determining the traveling posture with respect to each of traveling sections connecting the points, and determines, from among the points, a turn execution point at which the autonomous traveling body turns in order to take the determined traveling posture in each of the traveling sections, based on the turnability information, wherein the autonomous traveling body includes a travel control execution unit executing control for causing the autonomous traveling body to turn every time the autonomous traveling body reaches the turn execution point and to advance in each of the traveling sections in the determined traveling posture.

6 Claims, 11 Drawing Sheets

AUTONOMOUS TRAVELING SYSTEM

INCORPORATION BY REFERENCE

The present application claims priority under 35 U.S.C. § 119 to Japanese Patent Application No. 2021-036526 filed on Mar. 8, 2021. The content of the application is incorporated herein by reference in its entirety.

BACKGROUND OF THE INVENTION

Field of the Invention

The present invention relates to an autonomous traveling system.

Description of the Related Art

There has been known a delivery system in which an ordered product is collected from an automatic product collection site and delivered to a specified delivery destination by an unmanned delivery vehicle (see Japanese Laid-Open No. 2020-169082, for example).

However, depending on the travel path to the delivery destination, the unmanned delivery vehicle may not be able to advance to arrive at the delivery destination.

An object of the present invention is to provide an autonomous traveling system capable of enabling an autonomous traveling body to arrive at a destination more reliably.

SUMMARY OF THE INVENTION

One aspect of the present invention is an autonomous traveling system, including: a target route setting unit configured to set a target route from a departure place to a destination; an information storage unit configured to store beforehand, for each of points on the target route, turnability information indicating whether or not an autonomous traveling body traveling autonomously along the target route can turn to change a traveling posture thereof; and a travel planning unit configured to determine the traveling posture of the autonomous traveling body with respect to each of traveling sections connecting the points, and determine, from among the points, a turn execution point at which the autonomous traveling body turns in order to take the determined traveling posture in each of the traveling sections, on the basis of the turnability information, wherein the autonomous traveling body includes a travel control execution unit that executes control for causing the autonomous traveling body to turn every time the autonomous traveling body reaches the turn execution point and to advance in each of the traveling sections in the determined traveling posture.

According to another aspect of the present invention, in the autonomous traveling system, the travel planning unit specifies, for each of the traveling sections, the traveling posture that enables the autonomous traveling body to advance.

According to another aspect of the present invention, in the autonomous traveling system, the travel planning unit determines the traveling posture on the basis of a road width of each of the traveling sections and dimensions of a body portion of the autonomous traveling body.

According to another aspect of the present invention, in the autonomous traveling system, a body portion of the autonomous traveling body has a longitudinal direction, and the travel planning unit specifies, for a traveling section in which the autonomous traveling body is likely to roll over, a traveling posture in which the longitudinal direction is directed in a rollover direction of the autonomous traveling body.

According to another aspect of the present invention, in the autonomous traveling system, in a case where the autonomous traveling body is likely to roll over in a traveling section in which the autonomous traveling body advances, the travel planning unit redetermines the traveling posture taken at the traveling section to be a traveling posture that prevents the autonomous traveling body from rolling over, and redetermines a traveling posture for each of the traveling sections for taking the redetermined traveling posture at the traveling section and a turn execution point where the autonomous traveling body turns.

According to another aspect of the present invention, in the autonomous traveling system, in a case where there exists no combination of a traveling posture taken at each of the traveling sections and the turn execution point, the combination enabling the autonomous traveling body to arrive at the destination, the travel planning unit changes the destination to a newly changed destination that is a reachable point closest to the destination.

According to another aspect of the present invention, in the autonomous traveling system, in a case where there exists no combination of a traveling posture taken at each of the traveling sections and the turn execution point, the combination enabling the autonomous traveling body to arrive at the destination, when a distance from a current location of the autonomous traveling body to the destination is equal to or less than a first predetermined value, the travel planning unit changes the current location to the destination.

According to another aspect of the present invention, in the autonomous traveling system, the autonomous traveling body includes a control unit that executes control for sending a notification indicating that the autonomous traveling body has arrived at the destination, and the control unit includes the location of the newly changed destination in the notification, in a case where a distance between the destination prior to the change and the newly changed destination is equal to or greater than a second predetermined value.

According to one aspect of the present invention, an autonomous traveling body can arrive at a destination more reliably.

DETAILED DESCRIPTION OF THE PREFERRED EMBODIMENT

An embodiment of the present invention is now described hereinafter with reference to the drawings.

The present embodiment describes a transport vehicle as an example of the autonomous traveling body according to the present invention.

Figure 1:
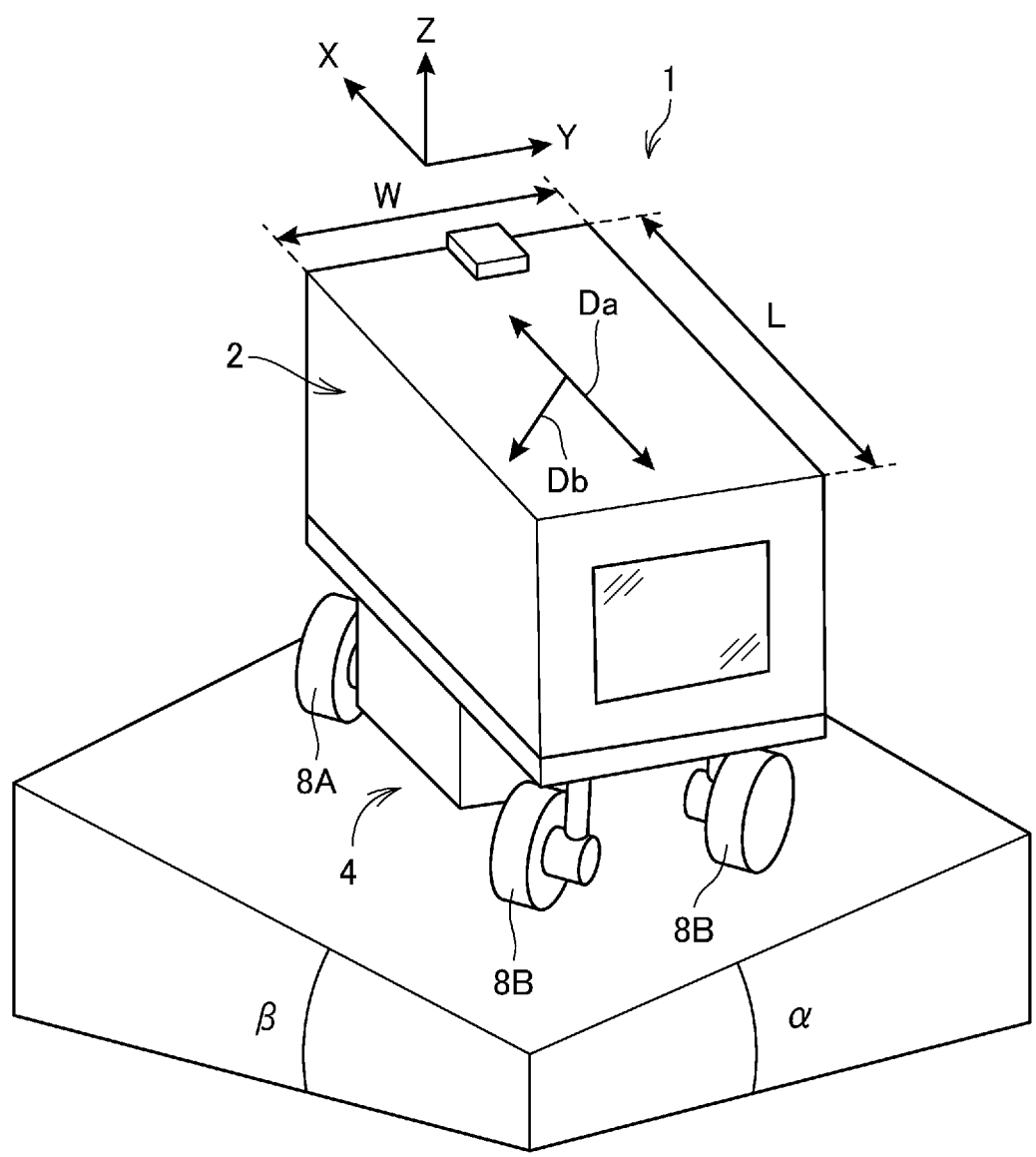
FIG. 1 shows a perspective view illustrating a configuration of a transport vehicle according to an embodiment of the present invention.
Figure 2:
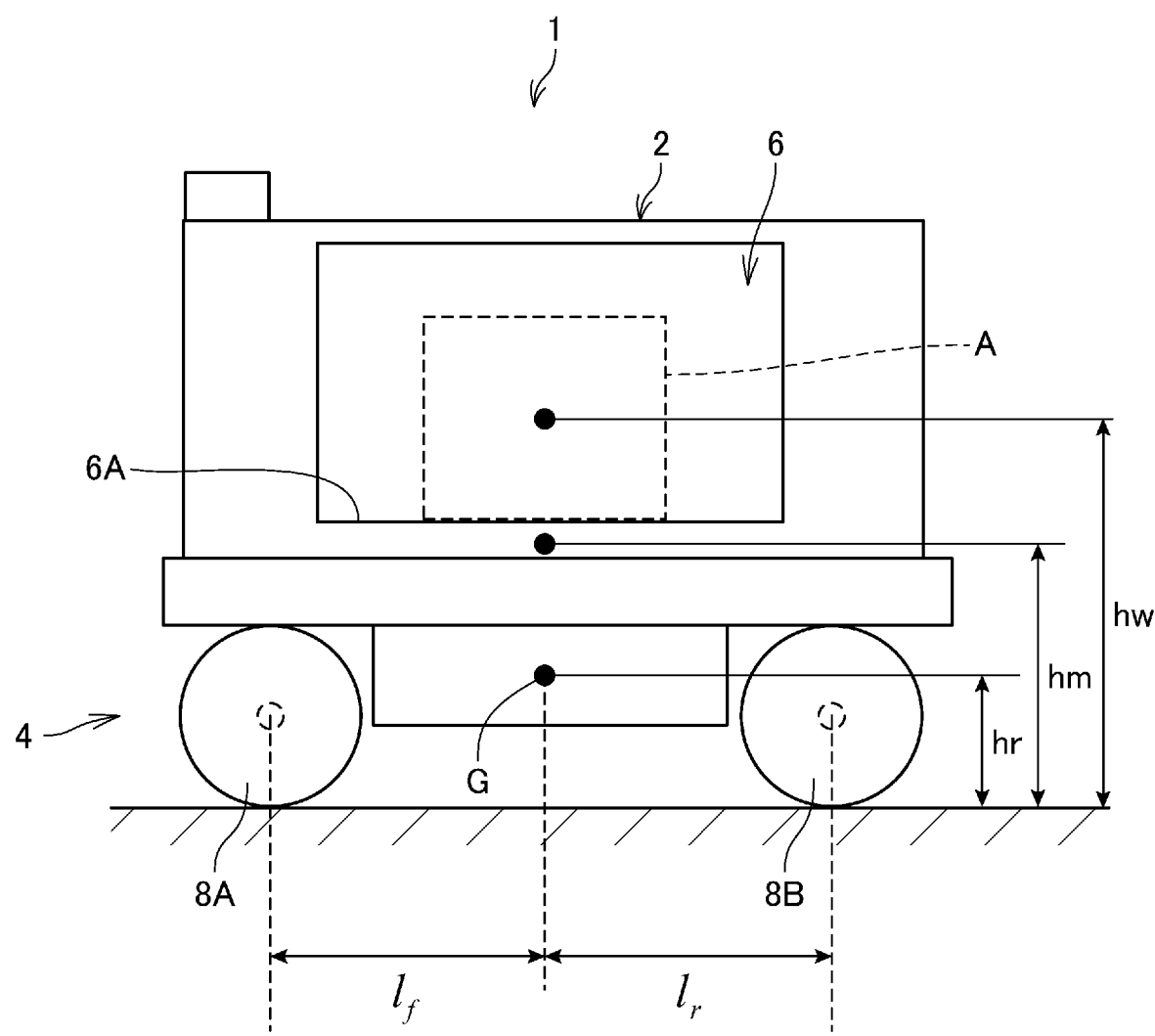
FIG. 2 shows a side view illustrating a configuration of the transport vehicle.

FIG. 1 shows a perspective view illustrating a configuration of a transport vehicle 1 according to the present embodiment, and FIG. 2 shows a side view of the transport vehicle 1.

The transport vehicle 1 is an unmanned vehicle that transports a package A to a delivery destination, and includes a body portion 2 corresponding to a vehicle body, and a traveling unit 4 having mechanical elements and electrical elements for moving the body portion 2. The body portion 2 has a substantially cuboid shape with a longitudinal direction Da, and is internally provided with a package compartment 6 carrying the package A, an object to be delivered. The traveling unit 4 includes a function of autonomously traveling along a target route B (FIG. 9) reaching a delivery destination. The traveling unit 4 includes a pair of front wheels 8A and a pair of rear wheels 8B, which are one of the mechanical elements, and the front wheels 8A and the rear wheels 8B are each simply referred to as "wheel" hereinafter unless otherwise distinguished.

In the traveling unit 4 of the present embodiment, the wheels 8 are mounted with tires respectively and configured to be able to steer at a steering angle. Since all the wheels 8 are configured to be able to steer, the transport vehicle 1 is capable of not only advancing in the longitudinal direction Da of the body portion 2, but also moving obliquely, as in so-called drifting, in a direction Db inclined with respect to the longitudinal direction Da, as shown in FIG. 2.

Hereinafter, the posture of the transport vehicle 1 advancing in the longitudinal direction Da is referred to as a "normal posture," and the posture of the transport vehicle 1 moving obliquely is referred to as a "obliquely moving posture." In addition, in a plan view in which the transport vehicle 1 is viewed from above, the direction in which the body portion 2 moves due to traveling of the traveling unit 4 is defined as "advancing direction." According to this definition, the normal posture refers to a posture in which the longitudinal direction Da of the body portion 2 is directed in the advancing direction in a plan view, and the obliquely moving posture refers to a posture in which the longitudinal direction Da of the body portion 2 is inclined with respect to the advancing direction in a plan view.

Figure 3:
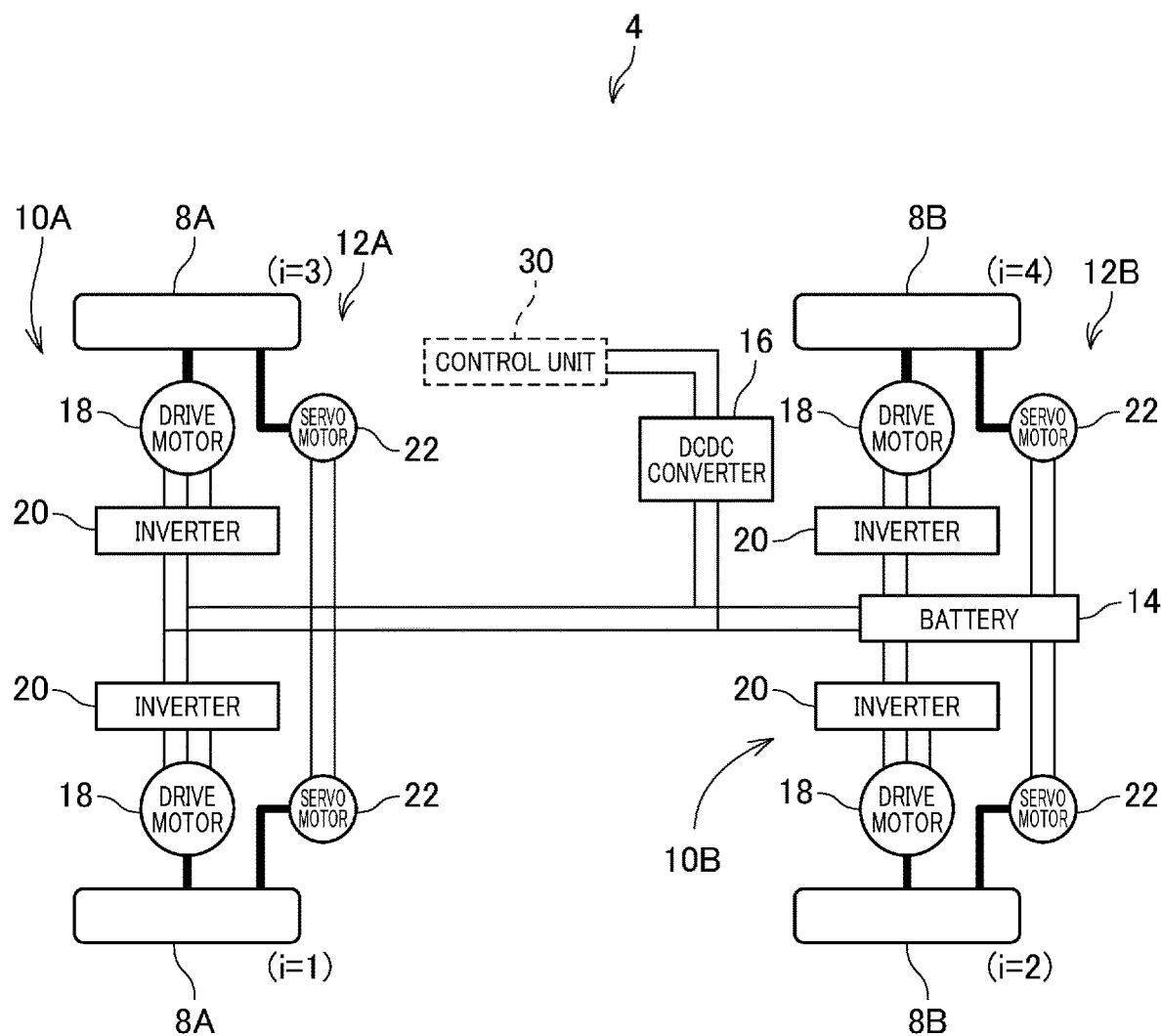
FIG. 3 shows a diagram illustrating a configuration of a traveling unit.

FIG. 3 shows a diagram illustrating a configuration of the traveling unit 4.

The traveling unit 4 includes a front wheel drive portion 10A that drives the front wheels 8A, a rear wheel drive portion 10B that drives the rear wheels 8B, a front wheel steering angle changing portion 12A that changes the steering angle of the front wheels 8A, and a rear wheel steering angle changing portion 12B that changes the steering angle of the rear wheels 8B, wherein all of these components are controlled by a control unit 30 described hereinafter.

The transport vehicle 1 of the present embodiment is an electric vehicle using electricity as an energy source, and therefore the traveling unit 4 includes a battery 14 as a power source, and a DCDC converter 16 that converts electric power of the battery 14 on the basis of an instruction from the control unit 30.

Furthermore, the front wheel drive portion 10A and the rear wheel drive portion 10B each include, for each wheel, a drive motor 18 as a power source, and an inverter 20 that drives the drive motor 18, and are each configured such that each wheel can be driven to rotate independently of each other.

Moreover, the front wheel steering angle changing portion 12A and the rear wheel steering angle changing portion 12B each include, for each wheel, a servomotor 22 that changes the steering angle of the corresponding wheel on the basis of an instruction from the control unit 30. In the obliquely moving posture, the steering angle of each wheel is changed by the servomotor 22 in such a manner that the body portion 2 advances in the advancing direction while the longitudinal direction Da remains inclined with respect to the advancing direction.

Also, by driving each wheel to rotate and controlling the steering angle thereof, the transport vehicle 1 of the present embodiment can change the traveling posture thereof between the normal posture and the obliquely moving posture by rotating the body portion 2 about a yaw axis on the spot to make a spin turn (simply referred to as "turn," hereinafter) without traveling (forward or rearward).

Figure 4:
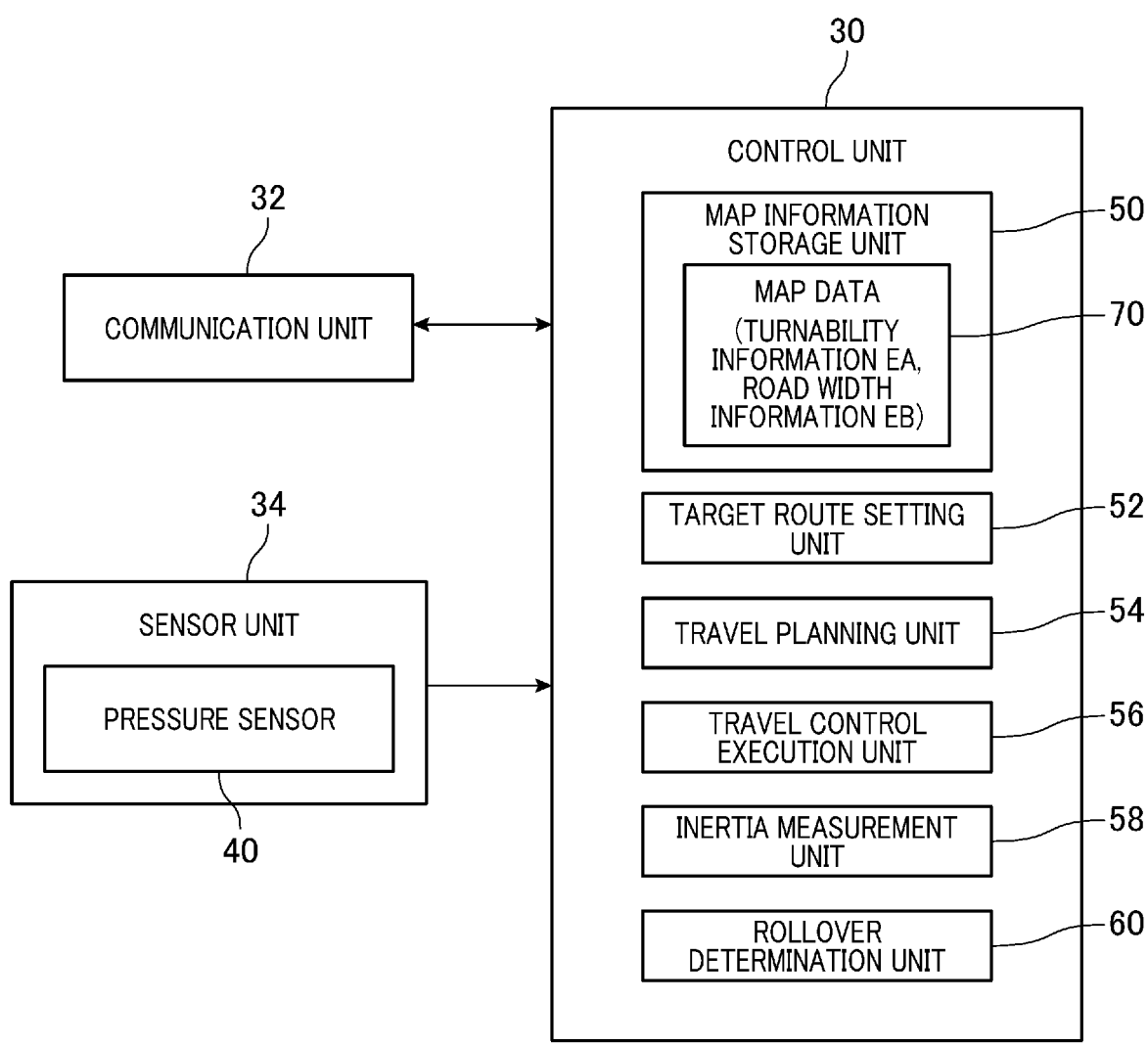
FIG. 4 shows a block diagram illustrating a functional configuration of the transport vehicle.

FIG. 4 shows a block diagram illustrating a functional configuration of the transport vehicle 1.

The transport vehicle 1 includes the control unit 30 for controlling each component, a communication unit 32, and a sensor unit 34.

The communication unit 32 includes a transmission/reception device (transmitter/receiver, circuit) that communicates with an external device through an appropriate wireless communication network, and performs various communications relating to delivery of the package A. Examples of the communications include communication with a user and communication with a server. The communication with a user is, for example, a communication for notifying the user at the delivery destination that the transport vehicle 1 has arrived at the delivery destination. The communication with a server is, for example, a communication for transmitting and receiving various information relating to a delivery operation to and from a management server managing the delivery.

The sensor unit 34 includes a sensor group required for autonomous traveling, and in the present embodiment, the sensor unit 34 also includes a pressure sensor 40. The sensor group required for autonomous traveling includes various sensors capable of detecting at least its own position, the traveling condition (advancing direction, acceleration, speed, etc.), and the posture of the transport vehicle 1, and a Lidar (Light detection and ranging), an acceleration sensor, a gyro sensor, a GNSS sensor, an imaging device (such as a CCD sensor) and the like are used as these sensors, for example.

Figure 5:
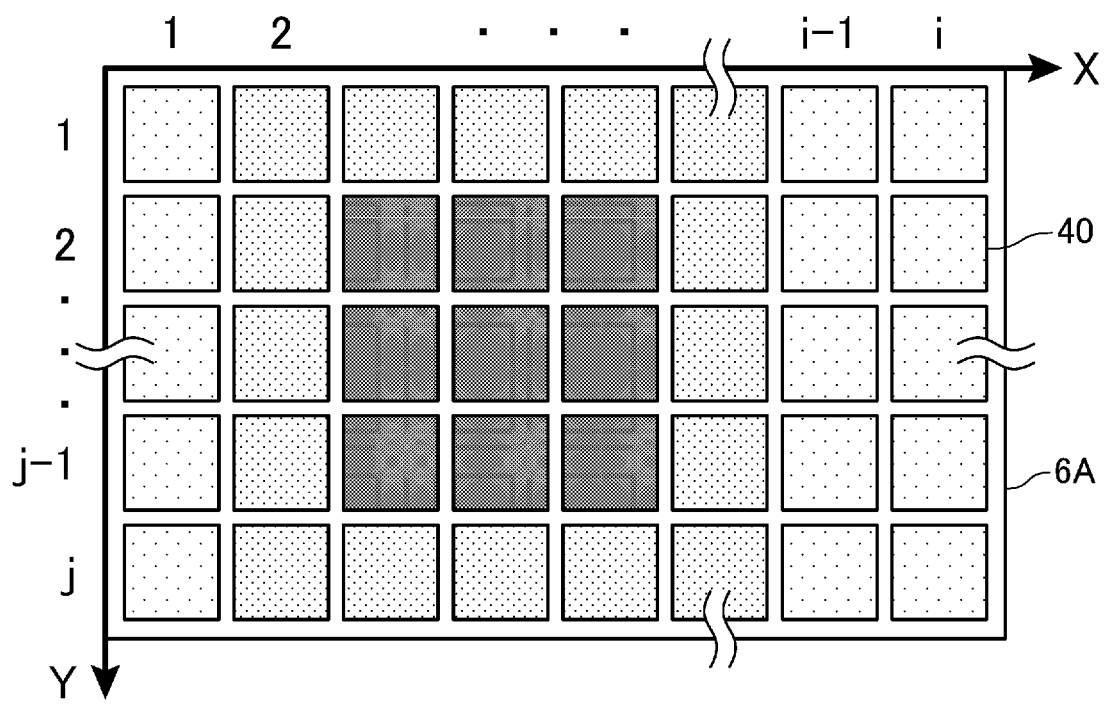
FIG. 5 shows a diagram illustrating an installation aspect of a pressure sensor.

The pressure sensor 40 is a sensor for detecting a weight $m_w$ of the package A placed on the package compartment 6, and is spread in a matrix over a floor surface 6A of the package compartment 6, as shown in FIG. 5. Specifically, on the floor surface 6A, i pressure sensors 40 are arranged in an X-axis direction, and j pressure sensors 40 are arranged in a Y-axis direction. When the package A is placed on the floor surface 6A, and when N pressure sensors 40 in the X-axis direction output signals and M pressure sensors 40 in the Y-axis direction output signals, the weight $m_w$ of the package A in the package compartment 6 is obtained by the following equation (1).

[Equation 1]

$$m_w = \sum_{j=0}^{M} \sum_{i=0}^{N} (P_{ij} \cdot S) \quad (1)$$

Here, S represents the area of the pressure sensors 40, and $P_{ij}$ a value obtained by converting the output values of the pressure sensors 40 into surface pressure. Also, the weight $m_w$ represents a total weight of all the packages A placed in the package compartment 6.

In addition, the X-axis direction is a direction of a total length L of the transport vehicle 1 (longitudinal direction Da), and the Y-axis direction is a direction of a vehicle width W of the transport vehicle 1 (short direction).

The weight $m_w$ of the package A is used to obtain a height of gravitational center $h_m$ of a center of gravity G of the transport vehicle 1 (FIG. 2), and the height of gravitational center $h_m$ is used to obtain a reaction force from the ground that acts on each wheel. That is, the transport vehicle 1 of the present embodiment has a configuration in which the reaction force of each wheel is obtained from the pressure sensors 40. A method for calculating the reaction force will be described hereinafter.

The control unit 30 has a computer that includes a processor such as a CPU or MPU, a memory device such as a ROM or RAM, a storage device such as an HDD or SSD, and an interface circuit for connecting sensors and peripheral devices. The processor executes a computer program stored in the memory device or storage device, to realize the functional configuration shown in FIG. 4.

That is, as shown in FIG. 4, the control unit 30 includes a map information storage unit (memory) 50, a target route setting unit 52, a travel planning unit 54, a travel control execution unit 56, an inertia measurement unit 58, and a rollover determination unit 60, as the functional configuration described above. An autonomous traveling system in which the transport vehicle 1 travels autonomously along the target route B is configured by the transport vehicle 1 and each of the functions provided in the control unit 30 of the transport vehicle 1.

Note that the transport vehicle 1 may be provided with a plurality of computers, and functional units of the control unit 30 shown in FIG. 2 may be realized by the respective computers.

Also, the autonomous traveling system may include the transport vehicle 1 and a server computer communicating with the transport vehicle 1 via a telecommunication line (Internet, etc.), wherein the server computer may include appropriate functional units provided in the control unit 30 of the present embodiment (e.g., the map information storage unit 50, the target route setting unit 52, the travel planning unit 54, and the like).

The map information storage unit 50 includes a memory device or a storage device for storing map data 70 used for setting a target route.

Figure 6:
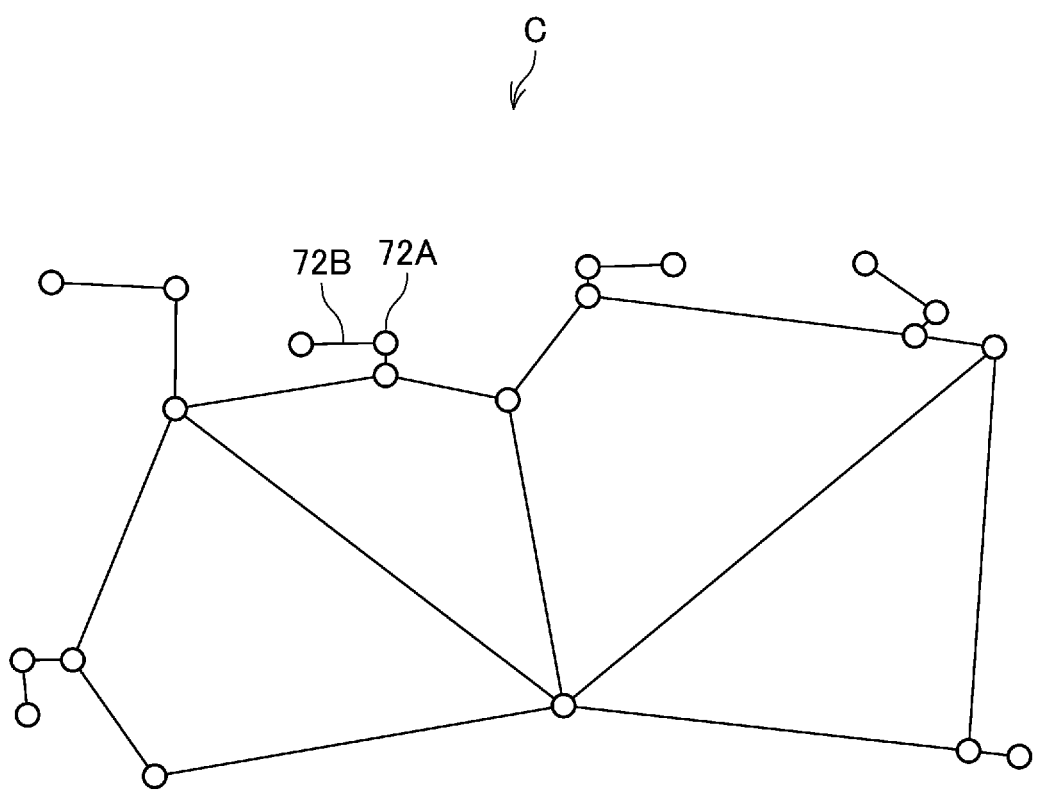
FIG. 6 shows an explanatory diagram of map data.

The map data 70 refers to data indicating a travel path network C covering travel paths on which the transport vehicle 1 can travel. As shown in FIG. 6, the travel path network C is represented by nodes 72A that are set at respective characteristic points on the travel path, such as intersections, forks, corners, and dead ends on the travel path, and linear links 72B connecting these nodes 72A. The map data 70 includes information on the nodes 72A and the link 72B.

The information on the nodes 72A include the ID of each node 72A and the position of the same on the map, and, in the present embodiment, turnability information EA (FIG. 4) as well. The turnability information EA is information indicating whether or not the transport vehicle 1 can turn at the point corresponding to the node 72A. For example, in a case where the point indicated by the node 72A does not have enough space for the transport vehicle 1 to turn, information indicating "not turnable" is stored in the turnability information EA of the node 72A.

The information on the links 72B include the ID of each link 72B and the position of the starting point and end point of the same, and, in the present embodiment, road width information EB (FIG. 4) indicating a road width of a traveling section corresponding to the link 72B as well. The road width information EB is information used to specify whether or not the transport vehicle 1 can advance in the normal posture and the obliquely moving posture. That is, in a case where the road width is narrower than the total length L of the transport vehicle 1, the impossibility of advancing in the traveling section in the obliquely moving posture is specified, and in a case where the road width is wider than the total length L of the transport vehicle 1, the possibility of advancing in the traveling section in any of the traveling postures of the normal posture and the obliquely moving posture is specified.

The target route setting unit 52 sets the target route B from the current location (departure place) to a destination (delivery destination) on the basis of the map data 70. As a method for setting the target route B, a well-known or publicly known appropriate method can be used, such as a route setting method based on cost calculation in which various parameters such as route lengths and the number of corners are set as costs. A method for acquiring the current location and the destination by the target route setting unit 52 is appropriate, and examples thereof include a method using manual input by a user and a method using input from the external device.

The travel planning unit 54 determines the traveling posture of the transport vehicle 1 at each link 72B on the target route B, and the nodes 72A where the transport vehicle 1 makes a turn in order to take the traveling posture. Details of this determination will be described hereinafter.

The travel control execution unit 56 mainly controls the traveling unit 4, and executes travel control to cause the transport vehicle 1 to autonomously travel each link 72B in the traveling posture determined by the travel planning unit 54, and to turn at the nodes 72A determined by the travel planning unit 54. Such travel control can adopt a publicly known or well-known technique for the control relating to autonomous traveling.

The inertia measurement unit 58 includes a function corresponding to an inertia measurement unit (IMU), and measures an acceleration and an angular velocity of the transport vehicle 1 during autonomous traveling, on the basis of a detection signal from the sensor unit 34.

The rollover determination unit 60 continuously determines whether or not the transport vehicle 1 is likely to roll over during autonomous traveling. In a case where the rollover determination unit 60 determines that the transport vehicle 1 is likely to roll over, the travel control execution unit 56 promptly executes stop control to immediately stop the transport vehicle 1, thereby preventing the transport vehicle 1 from rolling over.

Here, the rollover determination unit 60 of the present embodiment determines that the transport vehicle 1 is likely to roll over, when there is a high possibility that any of the wheels 8 could leave the road surface due to traveling on an inclined surface such as a slope or the like. The rollover determination unit 60 determines the possibility that each wheel 8 could leave the road surface, that is, the possibility of the transport vehicle 1 rolling over, on the basis of the reaction force that each wheel 8 receives from the road surface, and determines that the transport vehicle 1 is likely to roll over when the reaction force falls below a predetermined threshold value. Furthermore, the rollover determination unit 60 obtains the reaction force of each wheel 8 on the basis of a measurement result from the inertia measurement unit 58 (acceleration in a translational direction, and the angular velocity around the center of gravity) and the height of gravitational center $h_m$ of the transport vehicle 1 including the package A.

More specifically, the height of gravitational center $h_m$ of the transport vehicle 1 including the package A is obtained by the following equation (2).

[Equation 2]

$$h_m = \frac{h_r \cdot m_r + h_w \cdot m_w}{m_r + m_w} \quad (2)$$

Here, $m_r$ represents the weight of the transport vehicle 1 with the package compartment 6 being empty, $h_r$ the height of gravitational center of the transport vehicle 1 in this state from the ground, and $h_w$ the height of gravitational center of the package A from the ground.

Figure 7:
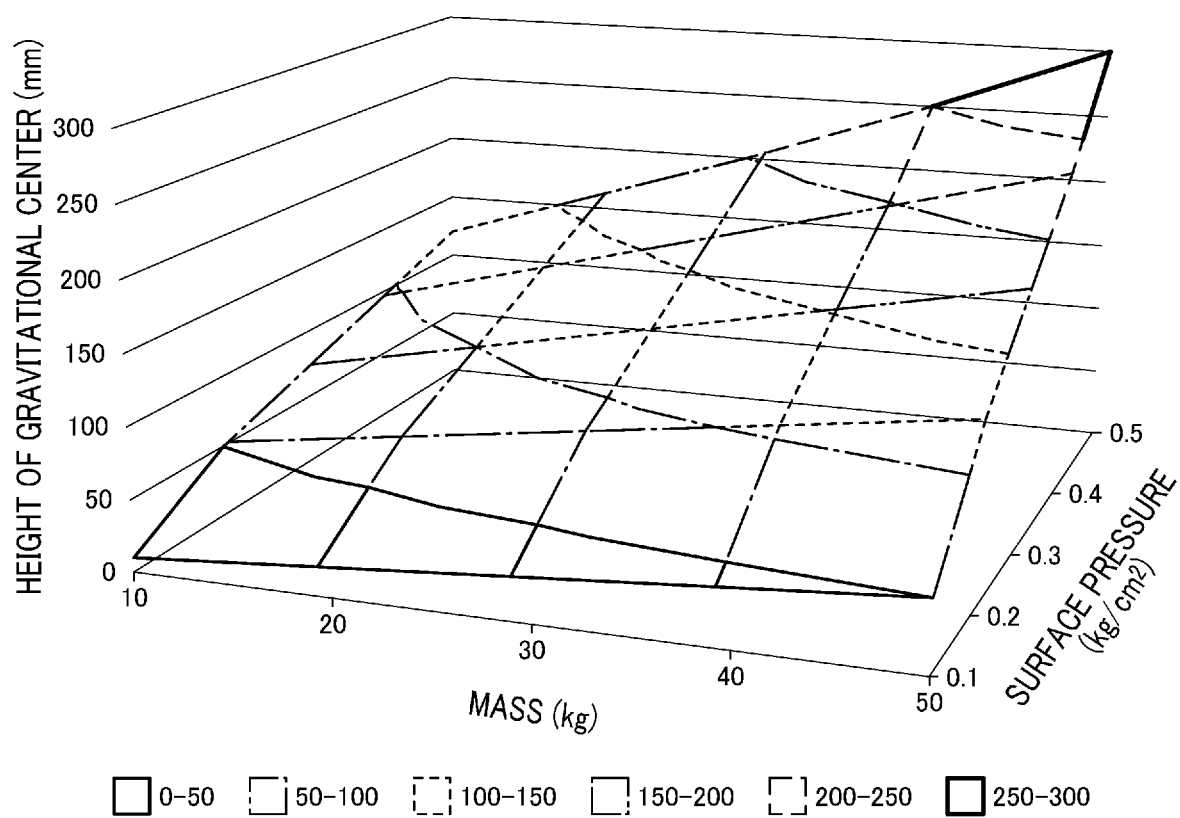
FIG. 7 shows a diagram illustrating an example of a relationship among a weight of a package, a surface pressure of the pressure sensor, and a height of gravitational center of the package.

Data indicating the relationship among the weight $m_w$ of the package A in the package compartment 6, the surface pressure of the pressure sensors 40, and the height of gravitational center of the package A in the package compartment 6, such as data shown in FIG. 7, are stored in the control unit 30 beforehand, and the rollover determination unit 60 obtains the weight $m_w$ of the package A from the detection by the pressure sensors 40 on the basis of the equation (1) above, and obtains the height of gravitational center $h_w$ on the basis of the aforementioned data.

Next, an equation of motion of the transport vehicle 1 in the translational direction is expressed by the following equations (3) to (5), and an equation of motion in a rotational direction around the center of gravity is expressed by the following equations (6) to (8).

[Equation 3]

$$m\frac{dv_x}{dt} = F_x + mg\sin\alpha \quad (3)$$

$$m\frac{dv_y}{dt} = F_y + mg\cos\alpha\sin\beta \quad (4)$$

$$m\frac{dv_z}{dt} = \sum_{i=0}^{3} Q_i - mg\cos\alpha\cos\beta \quad (5)$$

$$I_{xx}\frac{d\omega_x}{dt} = F_y \cdot h_m + \frac{W}{2}(Q_1 - Q_2 - (Q_3 + Q_4)) \quad (6)$$

$$I_{yy}\frac{d\omega_y}{dt} = F_x \cdot h_m + \frac{L}{2}(Q_1 + Q_3 - (Q_2 + Q_4)) \quad (7)$$

$$I_{zz}\frac{d\omega_z}{dt} = l_f(Y_1 + Y_2) - l_r(Y_1 + Y_2) \quad (8)$$

Figure 8:
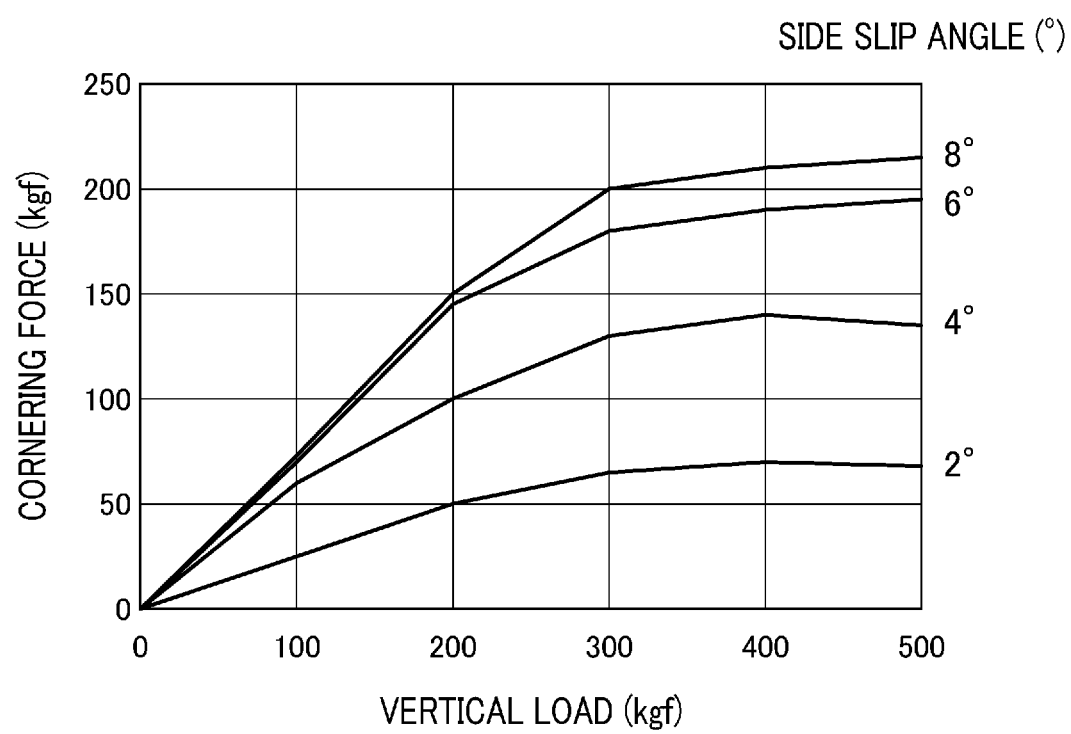
FIG. 8 shows a diagram illustrating an example of a relationship between a side slip angle of a wheel and a vertical load applied to the wheel.

Here, m represents the weight ($=m_r+m_w$) of the transport vehicle 1 with the package A loaded. $Q_i$ represents the reaction force applied to the wheel from the ground. The subscript i represents a number for identifying the wheel 8, and the correspondence between the subscript i and the wheel 8 is as shown in FIG. 3. An angle $\alpha$ and an angle $\beta$ are each an inclination angle of the road surface (FIG. 1). Moreover, $\omega$ represents the angular velocity around the center of gravity, and I represents the moment of inertia. $F_x$ represents a force in the X-axis direction, and $F_y$ represents a force in the Y-axis direction. $Y_i$ represents a cornering force acting on each wheel 8. The cornering force is obtained using data shown in, for example, FIG. 8 in which the relationship between a side slip angle of the wheel 8 (tire) and a vertical load applied to the wheel 8 is defined beforehand. In addition, as shown in FIG. 2, $l_f$ and $l_r$ in the equation (8) represent the distance between a front wheel shaft of the front wheels 8A and the center of gravity G, and the distance between a rear wheel shaft of the rear wheels 8B and the center of gravity G, respectively.

The rollover determination unit 60 uses these equations (5) to (8) to sequentially obtain reaction forces $Q_1$, $Q_2$, $Q_3$, and $Q_4$ of the respective wheels 8 during autonomous traveling.

Furthermore, the rollover determination unit 60 specifies the direction in which the transport vehicle 1 is likely to roll over (simply referred to as rollover direction, hereinafter) by comparing the reaction forces $Q_i$ (i=1 to 4) of the respective wheels 8 and specifying, for example, the position of the wheel 8 having the minimum reaction force and the position of the wheel 8 having the maximum reaction force. In a case where it is determined that the transport vehicle 1 is likely to roll over while autonomously traveling a certain traveling section, the transport vehicle 1 is designed to be able to autonomously travel the traveling section stably, without rolling over, in the normal posture or the obliquely moving posture, whichever the traveling posture in which the longitudinal direction Da is directed in the rollover direction.

As described above, the traveling posture at each link 72B and the nodes 72A where the transport vehicle 1 turns in order to change the traveling posture thereof, are determined by the travel planning unit 54 at the start of autonomous traveling. Even in a case where the rollover determination unit 60 determines that the transport vehicle 1 is likely to roll over, the travel planning unit 54 redetermines the traveling posture of the transport vehicle 1 at each link 72B and the nodes 72A where the transport vehicle 1 turns in order to change the traveling posture thereof, on the basis of the traveling posture that should be taken in the traveling section where the transport vehicle 1 is likely to roll over.

Such determination on the traveling posture and the nodes 72A where the transport vehicle 1 turns are now described.

In the following description, a node 72A in which the turnability information EA indicates "turnable," a node 72A in which the turnability information EA indicates "not turnable," and a node 72A where the transport vehicle 1 turns, are referred to as a turnable node 72Aa, an unturnable node 72Ab, and a turn execution node 72Ac, respectively.

Moreover, a link 72B in the traveling section in which the road width is wider than the total length L of the transport vehicle 1 and the transport vehicle 1 can advance in the obliquely moving posture is referred to as an obliquely movable link 72Ba, and a link 72B in the traveling section in which the road width is narrower than the total length L of the transport vehicle 1 and the transport vehicle 1 cannot advance in the obliquely moving posture is referred to as an obliquely immovable link 72Bb.

Figure 9:
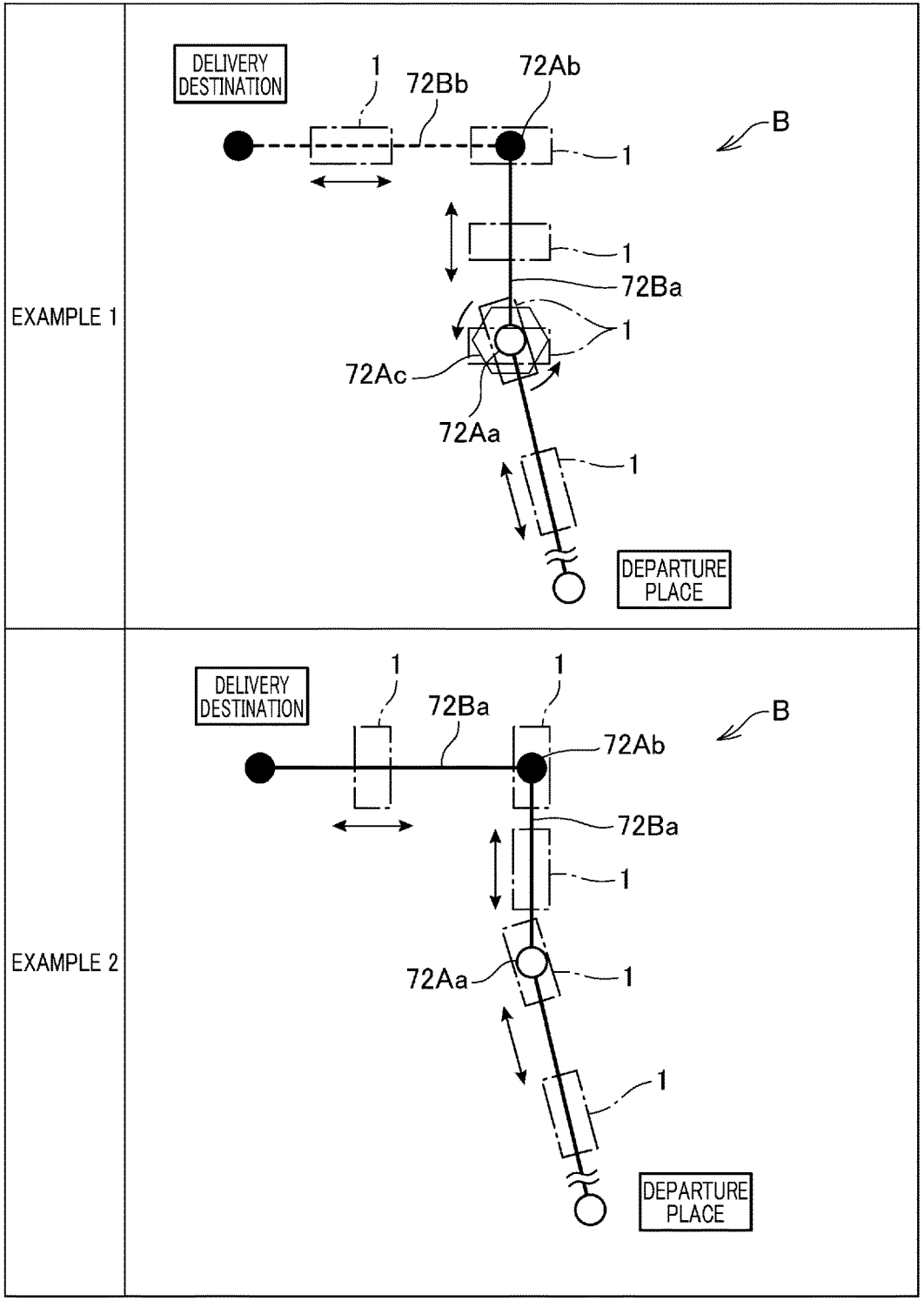
FIG. 9 shows a diagram illustrating examples of a target route.

FIG. 9 shows a diagram illustrating examples of the target route B.

The target route B according to Example 1 includes the unturnable node 72Ab, and the link 72B starting from this unturnable node 72Ab is the obliquely immovable link 72Bb.

In this case, in order for the transport vehicle 1 to advance on the obliquely immovable link 72Bb, the transport vehicle 1 needs to enter this obliquely immovable link 72Bb in the normal posture. However, since the transport vehicle 1 cannot turn at the unturnable node 72Ab, the transport vehicle 1 needs to enter the unturnable node 72Ab by advancing on the obliquely movable link 72Ba preceding the unturnable node 72Ab, in the obliquely moving posture. In order to do so, at the turnable node 72Aa which is the starting point of the obliquely movable link 72Ba, the transport vehicle 1 needs to turn in order to advance on the obliquely movable link 72Ba in the obliquely moving posture.

Thus, for the target route B of Example 1, the travel planning unit 54 determines that the traveling posture of the transport vehicle 1 traveling on the obliquely immovable link 72Bb starting from the unturnable node 72Ab to be the normal posture, determines that the traveling posture of the transport vehicle 1 traveling on the obliquely movable link 72Ba having the unturnable node 72Ab as its end point to be the obliquely moving posture, and determines that the turnable node 72Aa preceding the unturnable node 72Ab to be the turn execution node 72Ac.

As with Example 1, the target route B of Example 2 includes an unturnable node 72Ab, but the link 72B starting from this unturnable node 72Ab is the obliquely movable link 72Ba, unlike Example 1.

In this case, the transport vehicle 1 can advance on the obliquely movable link 72Ba in the obliquely moving posture without turning at the unturnable node 72Ab.

Therefore, for the target route B of Example 2, the travel planning unit 54 determines that the traveling posture of the transport vehicle 1 traveling on the obliquely movable link 72Ba starting from the unturnable node 72Ab to be the obliquely moving posture, and determines that the transport vehicle 1 does not need to turn at the turnable node 72Aa preceding the unturnable node 72Ab.

That is, in the present embodiment, since there are only two types of traveling postures, the normal posture and the obliquely moving posture, the travel planning unit 54 always determines that the traveling posture of the transport vehicle 1 on the obliquely immovable link 72Bb to be the normal posture.

Also, in a case where the target route B includes a unturnable node 72Ab, the travel planning unit 54 determine the traveling posture on the obliquely movable link 72Ba preceding the unturnable node 72Ab, depending on which one of the obliquely movable link 72Ba and the obliquely immovable link 72Bb the link 72B starting from the unturnable node 72Ab corresponds to, and in a case where the transport vehicle 1 needs to turn in order to take this determined traveling posture, the travel planning unit 54 determines the turn execution node 72Ac for executing the turn, from among the nodes 72A preceding the unturnable node 72Ab.

Operations of the present embodiment are described next.

Figure 10:
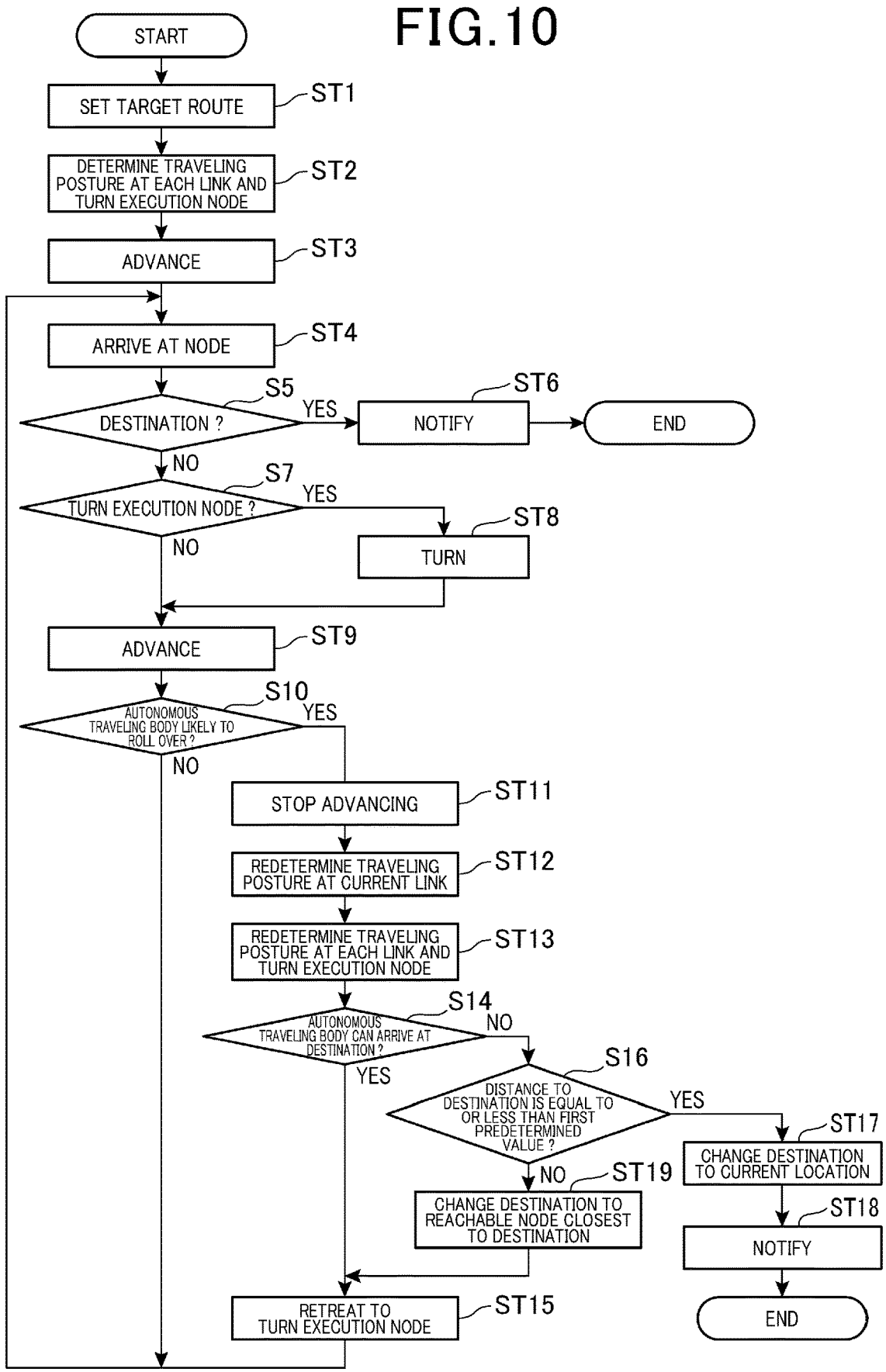
FIG. 10 shows a diagram illustrating an operation from the start of autonomous traveling of the transport vehicle to the arrival thereof at a destination.

FIG. 10 shows a diagram illustrating an operation from the start of autonomous traveling of the transport vehicle 1 to the arrival thereof at a destination.

When the package A is transported by the transport vehicle 1, the target route setting unit 52 first sets the target route B from the departure place to the delivery destination (step ST1). Next, the travel planning unit 54 determines the traveling posture at each link 72B and the turn execution nodes 72Ac, on the basis of the road width information EB on each link 72B and the turnability information EA on each node 72A (step ST2). Then, the travel control execution unit 56 controls the traveling unit 4 to start autonomous traveling, and causes the transport vehicle 1 to advance on the first link 72B in the determined traveling posture (step ST3).

Subsequently, when the travel control execution unit 56 detects that its own vehicle has reached a node 72A on the basis of the detection result of its own position (step ST4), the travel control execution unit 56 determines whether this node 72A is the destination or not (step ST5). In a case where the node 72A is the destination (step ST5: YES), since the delivery destination has been reached, the travel control execution unit 56 ends the processing relating to the autonomous traveling. Then, the control unit 30 notifies the user at the delivery destination of the arrival of its own vehicle at the delivery destination, through the communication unit 32 (step ST6). Upon receiving this notification, the user goes to the transport vehicle 1 to pick up the package A.

When the node 72A is not the destination (step ST5: NO), the travel control execution unit 56 determines whether the node 72A is the turn execution node 72Ac or not (step ST7).

In a case where the node 72A is the turn execution node 72Ac (step ST7: YES), the travel control execution unit 56 controls the traveling unit 4 to stop and turn its vehicle at this node 72A (step ST8), thereafter starts the autonomous traveling, and advances the vehicle on the next link 72B in the traveling posture taken after the turning (step ST9).

In a case where the node 72A is not the turn execution node 72Ac (step ST7: NO), the travel control execution unit 56 continues the autonomous traveling without stopping the vehicle at the node 72A and advances the vehicle on the next link 72B (step ST9).

Then, while the transport vehicle 1 is advancing on the link 72B, the rollover determination unit 60 determines whether or not the transport vehicle 1 is likely to roll over (step ST10). In a case where the transport vehicle 1 is unlikely to roll over (step ST10: NO), the processing procedure returns to step ST4, and the processing from the step ST4 is repeated.

On the other hand, in a case where the transport vehicle 1 is likely to roll over (step ST10: YES), the travel control execution unit 56 controls the traveling unit 4 to promptly stop the transport vehicle 1 (stop the advancement) (step ST11).

Next, on the basis of the rollover direction specified by the rollover determination unit 60, the travel planning unit 54 specifies the traveling posture in which the longitudinal direction Da is directed in the rollover direction, from the normal posture and the obliquely moving posture, and redetermines the specified traveling posture of the transport vehicle 1 as the traveling posture at the current link 72B (step ST12). Then, as with step ST2, the travel planning unit 54 redetermines the traveling posture at each link 72B where the transport vehicle 1 takes the traveling posture redetermined at the current link 72B, and the turn execution node 72Ac where the transport vehicle 1 turns (Step ST13). In a case where the transport vehicle 1 can arrive at the destination by the redetermined traveling posture and the turn execution node 72Ac (step ST14: YES), the travel control execution unit 56 controls the traveling unit 4 in order to change the traveling posture of the transport vehicle 1 at the current link 72B by turning the transport vehicle 1, and causes the transport vehicle 1 to retreat toward the turn execution node 72Ac (step ST15).

Thereafter, the control unit 30 returns the processing procedure to step ST4, and when the transport vehicle 1 arrives at the turn execution node 72Ac (step ST7: YES), the travel control execution unit 56 executes control for turning the transport vehicle 1 (step ST8). Then, the transport vehicle 1 starts advancing by advancing under the control of the travel control execution unit 56 (step ST9), and thereby advances in the redetermined traveling position, on the link 72B in the traveling section where it is determined that the transport vehicle 1 is likely to roll over, stably advancing in the traveling section without rolling over.

On the other hand, in a case where the transport vehicle 1 cannot arrive at the destination (step ST14: NO), the travel planning unit 54 changes the destination.

Figure 11:
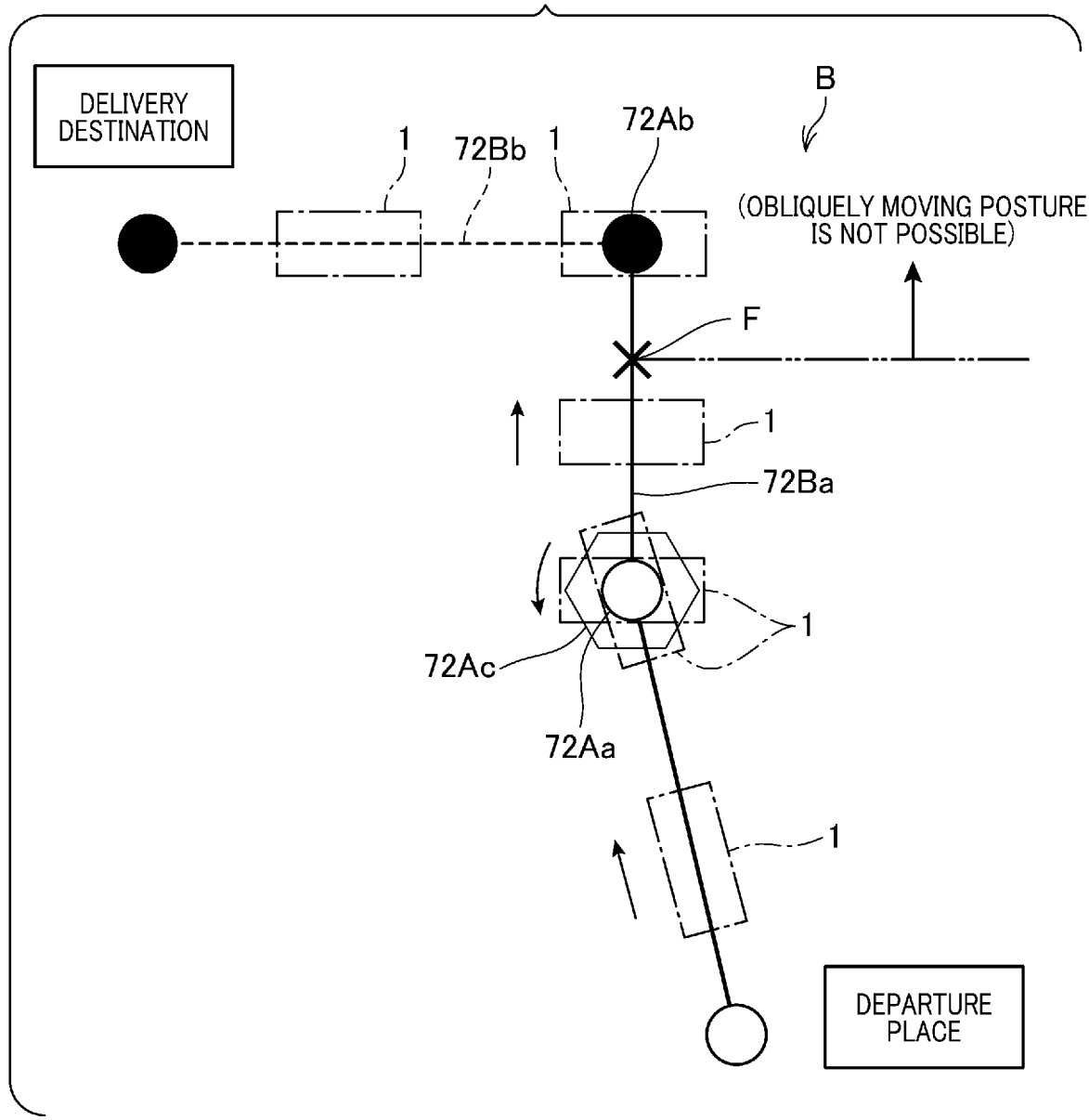
FIG. 11 shows an explanatory diagram illustrating a case where the transport vehicle cannot arrive at the destination.

For example, as shown in FIG. 11, in a case where the target route B includes an unturnable node 72Ab, and the link 72B starting from this unturnable node 72Ab is the obliquely immovable link 72Bb, the traveling posture at the obliquely movable link 72Ba having this unturnable node 72Ab as its end point is determined to be the obliquely moving posture, as described with reference to Example 1 shown in FIG. 9.

In this case, if a point F of the traveling section corresponding to the obliquely movable link 72Ba is, for example, a steep slope or the like extending from a public road or a private road to the entrance of the delivery destination, it may be determined that the transport vehicle 1 is likely to roll over at this point F located in the middle of the traveling section.

In this case, although the transport vehicle 1 can be caused to advance in this traveling section without rolling over by changing the traveling posture thereof on the obliquely movable link 72Ba to the normal posture, the transport vehicle 1 cannot advance on the obliquely immovable link 72Bb ahead of the unturnable node 72Ab, and therefore cannot arrive at the destination which is the delivery destination.

In a case where the transport vehicle 1 cannot arrive at the destination as described above, when the distance from the point F where the transport vehicle 1 is likely to roll over to the destination is equal to or less than a first predetermined value (step ST16: YES), the travel planning unit 54 changes the current location (point F) to the destination (step ST17). The distance that is reasonable for the user at the delivery destination to travel to the current location to pick up the package A is set as the first predetermined value, for example. In a case where the current location is changed to the destination in this manner, the transport vehicle 1 no longer needs to pass through the point F where the transport vehicle 1 is likely to roll over. In such a case, since the transport vehicle 1 does not advance any further, the control unit 30 notifies the user at the delivery destination that his/her own vehicle has arrived at the delivery destination, through the communication unit 32 (step ST18).

On the other hand, in a case where the distance from the point F where the transport vehicle 1 is likely to roll over to the destination is longer than the first predetermined value (step ST16: NO), the travel planning unit 54 changes the destination to the reachable node 72A which is closest to the destination (step ST19). As a result, even if the destination becomes unreachable, the transport vehicle 1 can be moved to the point closest to this destination.

Subsequently, in a case where the transport vehicle 1 arrives at the newly changed destination and the control unit 30 sends a notification (step ST6), if the distance between the destination prior to the change and the newly changed destination is equal to or greater than a second predetermined value, the control unit 30 also notifies the user of the position of his/her transport vehicle (the position of the newly changed destination). On the basis of this notification, even when the transport vehicle 1 cannot arrive at a predetermined destination (for example, the position designated by the user, such as the front door), the user can figure out the position of the transport vehicle 1 and easily find the transport vehicle 1.

According to the present embodiment, the following effects can be achieved.

The transport vehicle 1 of the present embodiment includes the map information storage unit 50 that stores beforehand, for each of the nodes 72A on the target route B, the turnability information EA indicating whether or not the transport vehicle 1 can make a turn in order to change the traveling posture thereof, and the travel planning unit 54 that determines the traveling posture of the transport vehicle 1 for each of the links 72B and determines the turn execution nodes 72Ac where the transport vehicle 1 turns in order to take the determined traveling posture at each of the links 72B, from among the nodes 72A on the basis of the turnability information EA. Then, the travel control execution unit 56 of the transport vehicle 1 turns every time the transport vehicle 1 reaches the turn execution nodes 72Ac, and controls the transport vehicle 1 to advance at each link 72B in the determined traveling posture.

According to this configuration, even in a case where the traveling section in which the traveling posture is limited (for example, the traveling section in which the transport vehicle 1 cannot move obliquely) starts from the point where the transport vehicle 1 cannot turn to change the traveling posture thereof (the unturnable node 72Ab), the traveling posture at each link 72B on the target route B and the turn execution nodes 72Ac are determined beforehand by the travel planning unit 54 in such a manner that the transport vehicle 1 takes the traveling posture in which the transport vehicle 1 can advance in this traveling section.

As a result, it is possible to avoid a situation in which the transport vehicle 1 cannot advance any further due to the inability to turn in the middle of the target route B, and as a result, the transport vehicle 1 can arrive at the destination more reliably.

In the present embodiment, the travel planning unit 54 specifies, for each of the links 72B in the traveling section, the traveling posture in which the transport vehicle 1 can advance in the traveling section.

Accordingly, the transport vehicle 1 can reliably pass through each traveling section.

In the present embodiment, the travel planning unit 54 determines the traveling posture on the basis of the road width of the traveling section and the dimensions (total length L and vehicle width W) of the body portion 2 of the transport vehicle 1.

Accordingly, even if the target route B includes a traveling section (obliquely immovable link 72Bb) in which the transport vehicle 1 cannot move obliquely due to the narrow road width, the transport vehicle 1 can reliably pass through this traveling section.

In the present embodiment, the body portion 2 of the transport vehicle 1 includes the longitudinal direction Da, and the travel planning unit 54 specifies, with respect to the traveling section in which the transport vehicle 1 is likely to roll over, the traveling posture in which the longitudinal direction Da is directed in the rollover direction of the transport vehicle 1.

Accordingly, the transport vehicle 1 can pass through the traveling section in which the transport vehicle 1 is likely to roll over, in a stable traveling posture that prevents the transport vehicle 1 from rolling over, thereby preventing a situation where the transport vehicle 1 rolls over and can no longer advance or where the package A is damaged.

In the present embodiment, in a case where the transport vehicle 1 is likely to roll over at a link 72B on which the transport vehicle 1 advances, the travel planning unit 54 redetermines the traveling posture at the link 72B to be a traveling posture that prevents the transport vehicle 1 from rolling over, and redetermines the traveling posture at each link 72B for taking the redetermined traveling posture in the traveling section and the turn execution node 72Ac where the transport vehicle 1 turns.

Thus, in response to the change of the traveling posture in the traveling section where the transport vehicle 1 is likely to roll over, the traveling posture thereof at each link 72B in the target route B and the turn execution node 72Ac where the transport vehicle 1 turns are redetermined appropriately.

In the present embodiment, in a case where there exists no combination of the traveling posture taken at each link 72B and the turn execution node 72Ac, the combination enabling the transport vehicle 1 to arrive at the destination, the travel planning unit 54 changes the destination to the reachable point closest to the destination.

As a result, even if the transport vehicle 1 is unable to arrive at the destination due to the change of the traveling posture thereof in the traveling section where the transport vehicle 1 is likely to roll over, the transport vehicle 1 can be reliably moved to the point closest to the destination.

In the present embodiment, in a case where there exists no combination of the traveling posture taken at each link 72B and the turn execution node 72Ac, the combination enabling the transport vehicle 1 to arrive at the destination, when the distance from the current location of the transport vehicle 1 to the destination is equal to or less than the first predetermined value, the travel planning unit 54 changes the current location to the destination.

As a result, when the transport vehicle 1 is already approaching a point, the distance from which to the destination is equal to or less than the first predetermined value, the delivery can be completed without causing the transport vehicle 1 to pass through the point F where the transport vehicle 1 is likely to roll over.

In the present embodiment, in a case where the distance between the destination prior to the change and the newly changed destination is equal to or greater than the second predetermined value, the control unit 30 includes the position of the newly changed destination in the notification.

As a result, even when the transport vehicle 1 is unable to arrive at a predetermined destination (for example, the position specified by the user), the user can figure out the position of the transport vehicle 1 and easily find the transport vehicle 1.

The transport vehicle 1 of the present embodiment includes the body portion 2 having the longitudinal direction Da, and the traveling unit 4 that travels autonomously. The transport vehicle 1 includes the rollover determination unit 60 that determines whether or not the transport vehicle 1 is likely to roll over due to traveling, and the travel control execution unit 56 that controls the traveling unit 4 in such a manner as to change the orientation of the longitudinal direction Da with respect to the advancing direction in a case where the rollover determination unit 60 determines that the transport vehicle 1 is likely roll over.

According to this configuration, when passing through the point F where the transport vehicle 1 is likely to roll over, the transport vehicle 1 can pass through the point in a traveling posture that prevents the transport vehicle from rolling over.

In the present embodiment, since the travel control execution unit 56 performs the control so that the longitudinal direction Da is directed in the rollover direction, the transport vehicle 1 does not rollover easily and can take a stable traveling posture when passing through the point F.

In the present embodiment, in a case where the rollover determination unit 60 determines that the transport vehicle 1 is likely to roll over while traveling along a predetermined target route B, the travel control execution unit 56 executes the control for changing the orientation of the longitudinal direction Da by turning the transport vehicle 1.

Therefore, even if the transport vehicle 1 is likely to roll over while traveling along the target route B, the transport vehicle 1 can continue traveling without rolling over since the transport vehicle 1 can take a stable traveling posture by making a turn, and thereby the transport vehicle 1 can arrive at the destination on the target route B.

In the present embodiment, since the travel control execution unit 56 controls to cause the transport vehicle 1 to turn while the transport vehicle is stopped (i.e., spin turn), the transport vehicle 1 can reliably take a stable traveling posture before passing through the point F where the transport vehicle 1 is likely to roll over.

In the present embodiment, when the transport vehicle 1 turns, the travel control execution unit 56 controls the transport vehicle 1 to retreat, along the target route B, to the turnable node 72Aa where the transport vehicle 1 can turn, and therefore the transport vehicle 1 can turn securely.

In the present embodiment, since the transport vehicle 1 includes the map information storage unit 50 that stores the turnability information EA indicating the nodes 72A on the target route B where the transport vehicle 1 can turn, points where the transport vehicle 1 can turn can be specified reliably.

In the present embodiment, the rollover determination unit 60 determines the possibility of the transport vehicle 1 rolling over due to traveling, on the basis of the reaction force that the wheels equipped in the traveling unit 4 receive from the road surface, and Therefore, the possibility that the transport vehicle 1 could roll over due to the wheels leaving the road surface, can be determined accurately.

In addition, the rollover determination unit 60 obtains such reaction force on the basis of the height of gravitational center $h_m$ of the transport vehicle 1, and the traveling condition (the equation of motion in the translational direction and the equation of motion in the rotational direction around the center of gravity). Thus, even in a case where the height of gravitational center $h_m$ of the transport vehicle 1 changes due to the weight $m_w$ of the package A, the reaction force can be obtained accurately.

Moreover, since the height of gravitational center $h_m$ of the transport vehicle 1 is measured using the pressure sensors 40 spread over the floor surface 6A of the package compartment 6 in which the package A is placed, the reaction force can be obtained without installing the stroke sensor in the suspension.

The embodiment described above is merely an example of one aspect of the present invention; thus, arbitrary modifications and applications are possible.

(Modification 1)

Although the foregoing embodiment has described the transport vehicle 1 as an example of the autonomous traveling body, the autonomous traveling body is not limited to a vehicle intended for transportation.

(Modification 2)

Although the foregoing embodiment has illustrated the case where the body portion 2 of the transport vehicle 1 has a cuboid shape with the longitudinal direction Da, the three-dimensional shape of the body portion 2 may be any shape as long as it has the longitudinal direction Da in a plan view.

(Modification 3)

In the foregoing embodiment, the total number of wheels of the traveling unit 4 is any number as long as the transport vehicle 1 can move obliquely and turn, and may be, for example, three (that is, a three-wheeled vehicle). Also, the transport vehicle 1 may include one or more auxiliary wheels (wheels that are not driven by the power source).

(Modification 4)

In the foregoing embodiment, the rollover determination unit 60 determines the possibility of the transport vehicle 1 rolling over due to traveling, on the basis of the reaction force that the wheels equipped in the traveling unit 4 receive from the road surface. However, the rollover determination unit 60 may determine the possibility of the transport vehicle 1 rolling over, on the basis of the imaging information of a camera imaging the traveling condition of the transport vehicle 1 (for example, the slope or a step of the road surface displayed in the advancing direction).

(Modification 5)

In the foregoing embodiment, the map data 70 may include information indicating the inclination of the traveling section of each link 72B (direction of slope or inclination) beforehand, and the travel planning unit 54 may determine the traveling posture taken at each link 72B, on the basis of the information and the road width information EB.

OTHER MODIFICATIONS

The functional block shown in FIG. 4 is a schematic diagram showing the functional components of the transport vehicle 1 classified according to the details of the main processing and functions, in order to facilitate the understanding of the present invention, and the functional components of the transport vehicle 1 can also be classified into more components according to the details of the processing and functions. The functional components can also be classified in such a manner that one functional component executes more processing.

REFERENCE SIGNS LIST

1 Transport vehicle (autonomous traveling body)
2 Body portion
4 Traveling unit
6 Package compartment
6A Floor surface
8 Wheel
30 Control unit
32 Communication unit
40 Pressure sensor
50 Map information storage unit (storage unit)
52 Target route setting unit
54 Travel planning unit
56 Travel control execution unit
58 Inertia measurement unit
60 Rollover determination unit
70 Map data

72A Node (point)
72Aa Turnable node
72Ab Unturnable node
72Ac Turn execution node (turn execution point)
72B Link (traveling section)
72Ba Obliquely movable link
72Bb Obliquely immovable link
A Package
B Target route
Da Longitudinal direction
EA Turnability information
EB Road width information

What is claimed is:

1. An autonomous traveling system comprising:
a processor; and
a memory, wherein
the processor includes a target route setting unit configured to set a target route from a departure place to a destination,
the memory is configured to store beforehand, for each of points on the target route, turnability information indicating whether or not an autonomous traveling body traveling autonomously along the target route can turn to change a traveling posture of the autonomous traveling body,
the processor includes:
 a travel planning unit configured to determine the traveling posture of the autonomous traveling body with respect to each of traveling sections connecting the points, and determine, from among the points, a turn execution point at which the autonomous traveling body turns in order to take the determined traveling posture in each of the traveling sections, on the basis of the turnability information; and
 a travel control execution unit that executes control for causing the autonomous traveling body to turn every time the autonomous traveling body reaches the turn execution point and to advance in each of the traveling sections in the determined traveling posture,
in a case where the autonomous traveling body is likely to roll over in a traveling section in which the autonomous traveling body advances, the travel planning unit redetermines the traveling posture taken at the traveling section to be a traveling posture that prevents the autonomous traveling body from rolling over, and redetermines a traveling posture for each of the traveling sections for taking the redetermined traveling posture at the traveling section and a turn execution point where the autonomous traveling body turns, and
in a case where there exists no combination of a traveling posture taken at each of the traveling sections and the turn execution point, the combination enabling the autonomous traveling body to arrive at the destination, when a distance from a current location of the autonomous traveling body to the destination is equal to or less than a first predetermined value, the travel planning unit changes the current location to the destination.

2. The autonomous traveling system according to claim 1, wherein the travel planning unit specifies, for each of the traveling sections, the traveling posture that enables the autonomous traveling body to advance.

3. The autonomous traveling system according to claim 1, wherein the travel planning unit determines the traveling posture on the basis of a road width of each of the traveling sections and dimensions of a body portion of the autonomous traveling body.

4. The autonomous traveling system according to claim 1, wherein
   a body portion of the autonomous traveling body has a longitudinal direction, and
   the travel planning unit specifies, for a traveling section in which the autonomous traveling body is likely to roll over, a traveling posture in which the longitudinal direction is directed in a rollover direction of the autonomous traveling body.

5. The autonomous traveling system according to claim 1, wherein, in a case where there exists no combination of the traveling posture taken at each of the traveling sections and the turn execution point, the combination enabling the autonomous traveling body to arrive at the destination, when the distance from the current location of the autonomous traveling body to the destination is longer than the first predetermined value, the travel planning unit changes the destination to a newly changed destination that is a reachable point closest to the destination.

6. The autonomous traveling system according to claim 5, wherein
   the processor includes a control unit that executes control for sending a notification indicating that the autonomous traveling body has arrived at the destination, and
   the control unit includes the location of the newly changed destination in the notification, in a case where a distance between the destination prior to the change and the newly changed destination is equal to or greater than a second predetermined value.

* * * * *